United States Patent [19]

Abe

[11] 4,401,384
[45] Aug. 30, 1983

[54] MIRROR DEVICE OF COPYING MACHINE OR THE LIKE

[75] Inventor: Tadashi Abe, Hino, Japan

[73] Assignee: Konishiroku Photo Industry Co., Ltd., Japan

[21] Appl. No.: 289,122

[22] Filed: Jul. 31, 1981

[30] Foreign Application Priority Data

Aug. 8, 1980 [JP] Japan .............................. 55-112310[U]
Aug. 29, 1980 [JP] Japan .............................. 55-122485[U]

[51] Int. Cl.³ ...................... G03G 15/00; G03B 27/70
[52] U.S. Cl. ...................................... 355/11; 355/66; 355/8
[58] Field of Search .................. 355/11, 8, 43, 49, 51, 355/57, 65, 66

[56] References Cited

U.S. PATENT DOCUMENTS 4,135,812  1/1979  Kingsland .................... 355/65 X Primary Examiner—R. L. Moses
Attorney, Agent, or Firm—James E. Nilles

[57] ABSTRACT

A mirror device for an electrophotographic copying machine including a mirror support, in which base portions of a pair of support members are to both ends of an elongated rod member extended in the direction of width of the optical system. Locating planes capable of fixing plural mirrors for use in a moving optical system with a predetermined angle between them are formed on said base portions. Said predetermined angle is 90 degrees.

15 Claims, 8 Drawing Figures

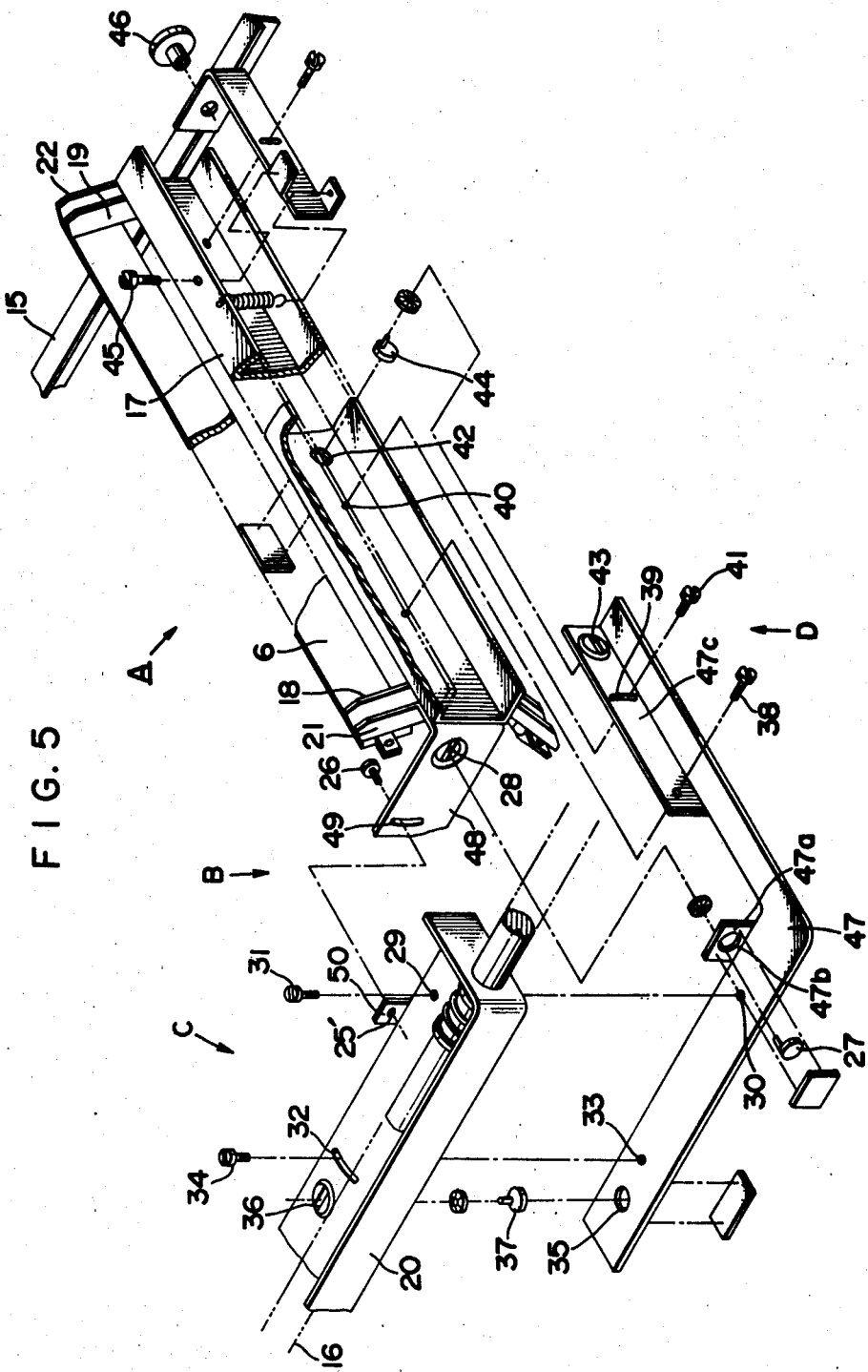

MIRROR DEVICE OF COPYING MACHINE OR THE LIKE

BACKGROUND OF THE INVENTION

1. Field of the Invention

This invention relates to a mirror device adjusted to 90 degrees, for example, for use in a slit exposure optical system of an electrophotographic copying machine or the like. More specifically, the present invention relates to a mirror device having a mirror support and an adjusting device for adjusting the mirror support with respect to an optical path.

In an electrophotographic copying machine or the like, a mirror assembly adjusted to 90 degrees, for example, has been employed in order to convert the optical path ranging from an exposing portion to a photosensitive member of an image-reproducing portion and to keep constant the optical path length.

In a support of 90°-mirrors, alignment characteristics of two mirrors orthogonal to each other exert significant influences upon focus, distortion, and extension and diminishment of an image, and the like. For this reason, it is a customary practice to cast a block as the base of the assembly by die-casting or the like and to cut out a reference surface for locating the mirrors on this block by precision mechanical cutting work or to provide an adjusting screw to the base that has been subjected to bend working. Accordingly, in the former construction, the weight of the 90°-mirror support becomes great so that a load for moving the mirrors at the time of exposure for copying becomes great and large impact is applied to the support when the mirrors stop. Moreover, this construction results in the increase in the cost of production. In accordance with the latter construction, on the other hand, strength of the assembly is likely to become insufficient so that the adjusting screw accidentally gets loose, thereby causing various problems.

In the 90°-mirror support of the abovementioned kind, it is necessary to secure the three-dimensional position and posture of the exposure optical system relative to the optical axis. Accordingly, conventional 90°-mirror supports are equipped with a built-in fine adjusting mechanism for performing the fine adjustment of the mirror positions and angles. When this adjusting mechanism is employed, however, the 90°-mirror support inevitably becomes complicated in construction and great in weight so that the cost of production of the product increases and the allowance for adjustment is restricted. To cope with this problem, accuracy of finishing and assembly must be made severer for other constituents.

SUMMARY OF THE INVENTION

It is therefore an object of the present invention to provide a mirror device having a mirror support which is small in the overall weight, has sufficient mechanical strength, is free from a requirement for strict accuracy of finishing but is capable of providing mirror alignment as well as an accurate angle once it is simply assembled. In accordance with the present invention, this object can be accomplished by a mirror device including a mirror support which mirror support is characterized in that base portions of a pair of support members, having formed thereon locating planes capable of fixing plural mirrors for use in a moving optical system with a predetermined angle between them, and formed by a sheet-like material, are so fixed to both ends of an elongated rod-like member extended in the direction of width of the optical system as to support the mirrors by the locating planes of the support members.

It is another object of the present invention to provide a mirror device including an adjusting device for a 90°-mirror support, which adjusting device has a large range of allowance for adjustment, simplifies the construction of the 90°-mirror support itself and reduces the cost of its production.

In accordance with the present invention, the abovementioned object can be accomplished by a mirror device including a mirror adjusting device, which mirror adjusting device comprises first adjusting means for effecting fine adjustment of a mirror support with respect to a slider member capable of moving along substantially horizontal guide members with a support point orthogonal to the guide members being the center; second adjusting means for effecting fine moving adjustment of an auxiliary member having one end thereof fixed to the mirror support with a partial support point of a support plane defined at a right angle to the guide members being the center; and third adjusting means for effecting fine moving adjustment of the mirror support with a support point being the center, which support point interconnects the mirror support to the auxiliary member and is parallel to the guide members.

These and other objects and features of the present invention will become more apparent from the following detailed description to be read in conjunction with the accompanying drawings.

BRIEF DESCRIPTION OF THE DRAWINGS

FIG. 5 is an exploded perspective view of a 90°-mirror support and its peripheral portions;

DESCRIPTION OF THE PREFERRED EMBODIMENTS

Figure 1:
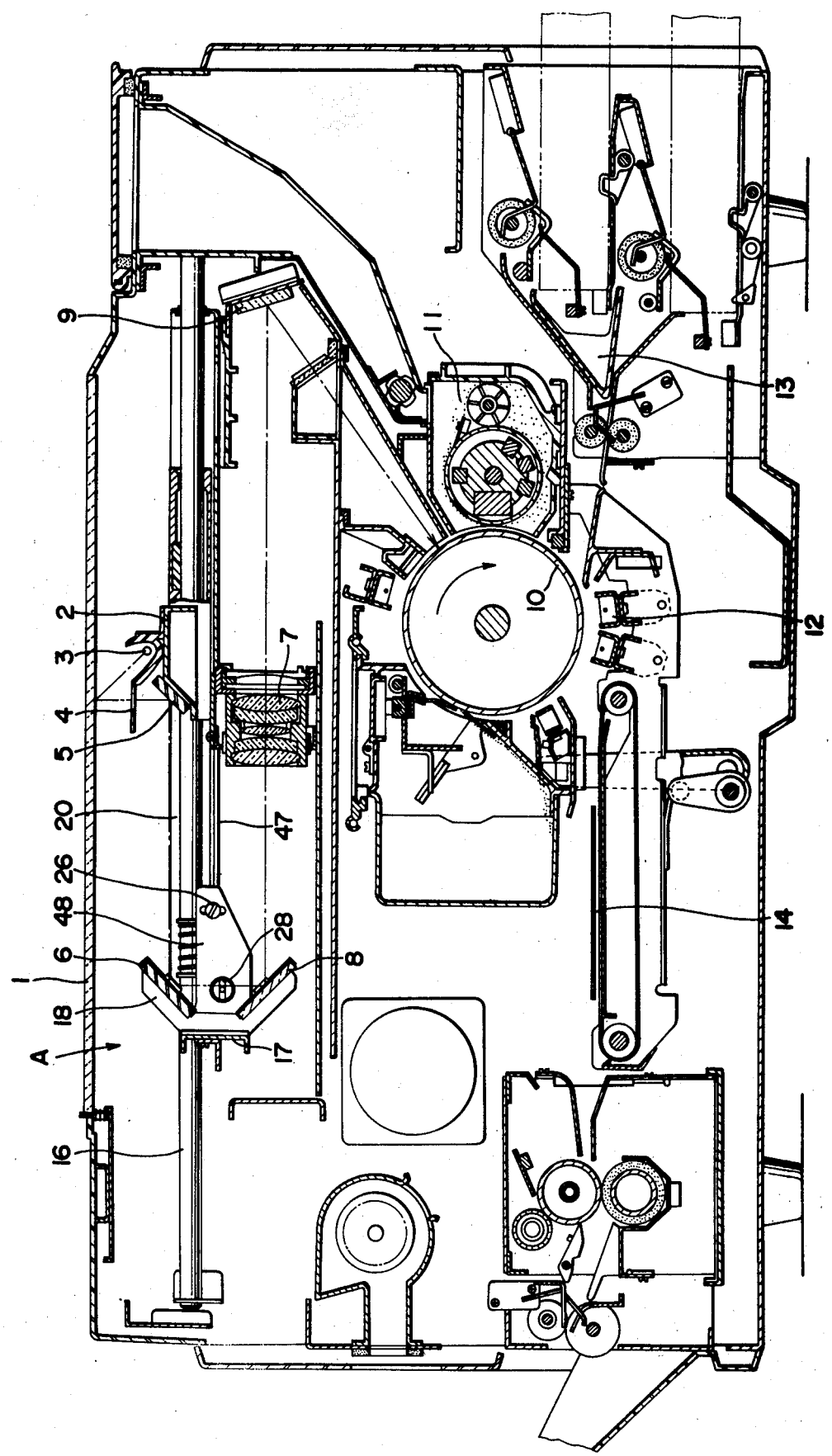
FIG. 1 is a sectional view of an electrophotographic copying machine equipped with a mirror device of the present invention as a whole.
Figure 2:
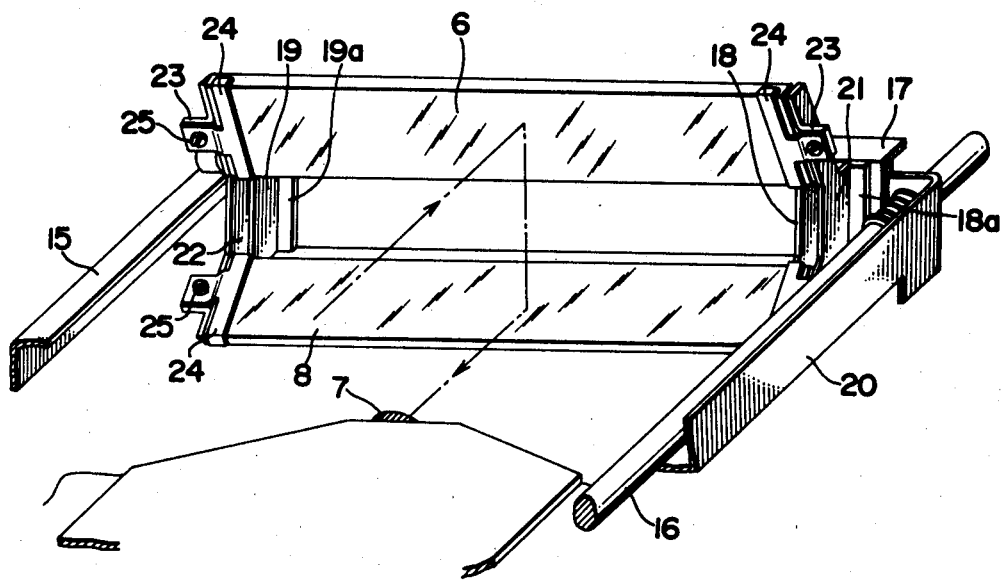
FIG. 2 is a perspective view of a mirror support as a whole.
Figure 3:
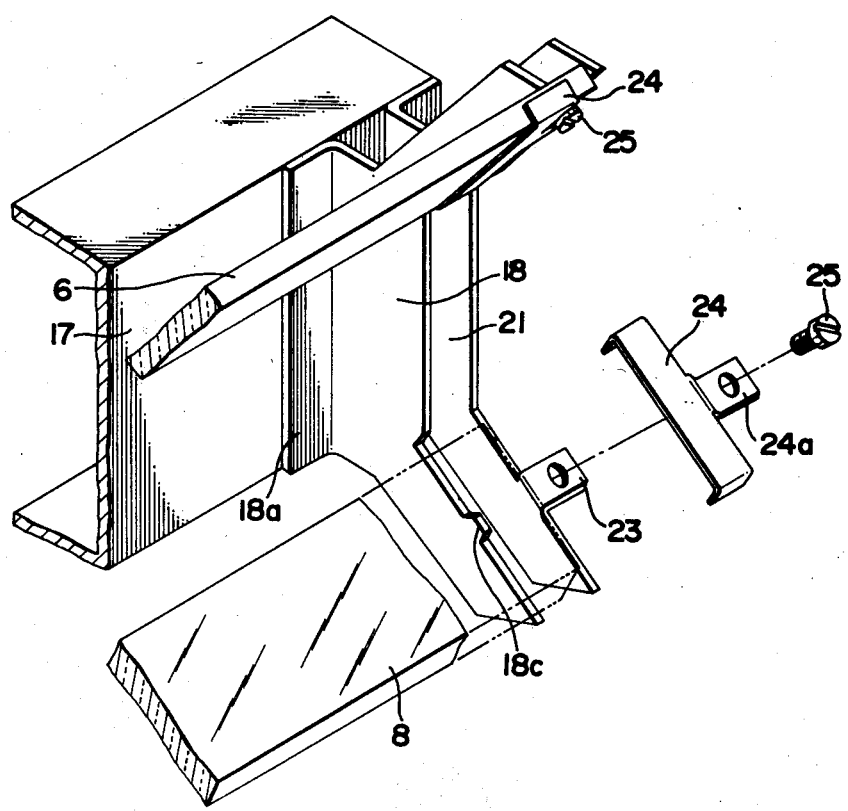
FIG. 3 is an enlarged sectional view of the principal portions of the mirror support.

FIG. 1 is a sectional view of an electrophotographic copying machine employing the 90°-mirror support A in accordance with the present invention as a whole. A moving table 2 is so disposed immediately below document glass plate 1 as to be capable of reciprocating to the right and left. The moving table 2 has an illumination lamp 3 illuminating the document glass plate 1, and the reflected image of the original illuminated by this lamp 3 is incident to a first mirror 5 through a slit 4.

A 90°-mirror support assembly A, which is moved in the same direction as the abovementioned moving table 2 but at a speed of ½, is equipped with a second mirror 6 to which the reflected rays of light from the first mirror 5 are incident and with a third mirror 8 which allows an optical image to be incident to a projection lens 7. The projection lens 7 reproduces the image of an original around the circumferential surface of a photosensitive drum 10 via a fourth mirror 9. Accordingly, during the period in which the image of the original on the photosensitive drum 10 passes through a developing device 11, it is subjected to development by toner, and this toner image is transferred onto transfer paper 14 that is fed from a paper feeder 13.

Figure 4:
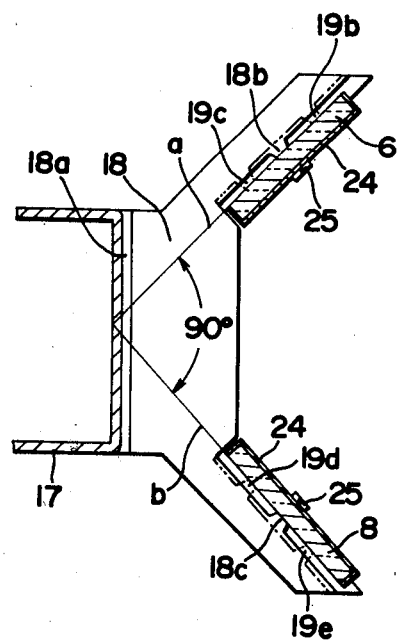
FIG. 4 is an enlarged sectional view of the mirror support.

The 90°-mirror support assembly A is equipped with a rod member 17 having a ]-shaped cross-section and bridged between a guide rail 15 and a guide rod 16 that extend in parallel to each other in the direction of width. A pair of support plates 18, 19 are punched out in a Y-shape from a metal sheet and the base portions 18a, 19a of these support plates 18, 19 are spot-welded to both ends of a rod-like member 17 having rigidity, respectively. Locating planes a and b, that are at right angles to each other, are defined on the support plates 18 and 19 as shown in FIG. 4 in order to locate the aforementioned second and third mirrors 6 and 8. In order to define these locating planes, the embodiment shown in the drawings is furnished with protuberances 18b, 18c, 19b-19e that are capable of supporting the second and third mirrors 6, 8 at three points. In other words, a pair of protuberances 18b and 18c are formed to project from the support plate 18 to support one end of back surface each of the second and third mirrors 6 and 8. Two pairs of protuberances 19b-19e are defined to project from the other support plate 19 in order to support the other back end of surface each of the second and third mirrors 6 and 8. The positions and mutual relationship of these protuberances 18b, 18c, 19b-19e can be accurately determined in accordance with production techniques for punching out the support plates 18 and 19.

For the purpose of fixing the mirrors 6, 8 to the support plates 18, 19, holding plates 21, 22 having a similar shape to that of the support plates 18, 19 are spot-welded to both ends of the rod-like member 17. Each holding plate 21, 22 has a fitting lug 23 bent at a right angle, and a fixing lug 24a of a support spring 24 formed in a ]-shape is fixed to each fitting lug 23 by a screw 25. Each support spring 24 holds the end portions of the second and third mirrors 6, 8 and resiliently pushes these mirrors 6, 8 to the aforementioned protuberances 18b, 18c, 19b-19e.

As is obvious from the foregoing description, locating of the mirrors in the mirror support of the present invention is effected by means of the punched support plates that can maintain mechanical accuracy as well as dimensional accuracy. Hence, the mirror support can be assembled without specific mechanical finishing work, in particular. Moreover, the mirror support of the present invention is economical to produce and light in weight and has a high rigidity construction. Accordingly, the support of the present construction can be most suitably adapted to mirror support of a high speed copying machine or to a mirror support of other optical instruments or apparatuses.

FIGS. 5 through 8 show in detail the 90°-mirror support and its peripheral portions. The 90°-mirror support assembly A is guided and moved by the guide rod 16 and the guide rail 15 which is parallel to the guide rod 16. Namely, the guide rod 16 supports a sliding member 20 capable of moving along the guide rod 16, and the following three sets of adjusting means are disposed between the sliding member 20, an auxiliary plate 47 put on the sliding member 20 and the 90°-mirror support assembly A.

Figure 6:
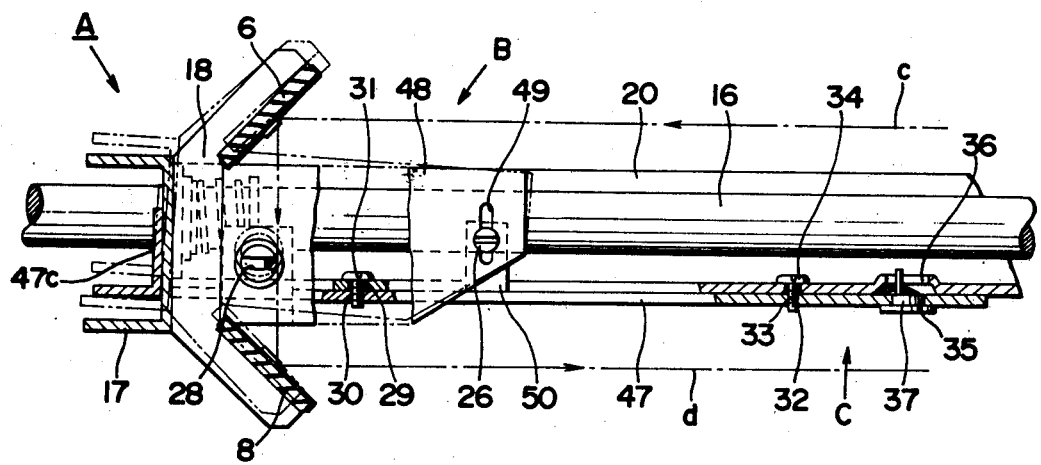
FIG. 6 is a vertical sectional view of the above-mentioned portions.
Figure 7:
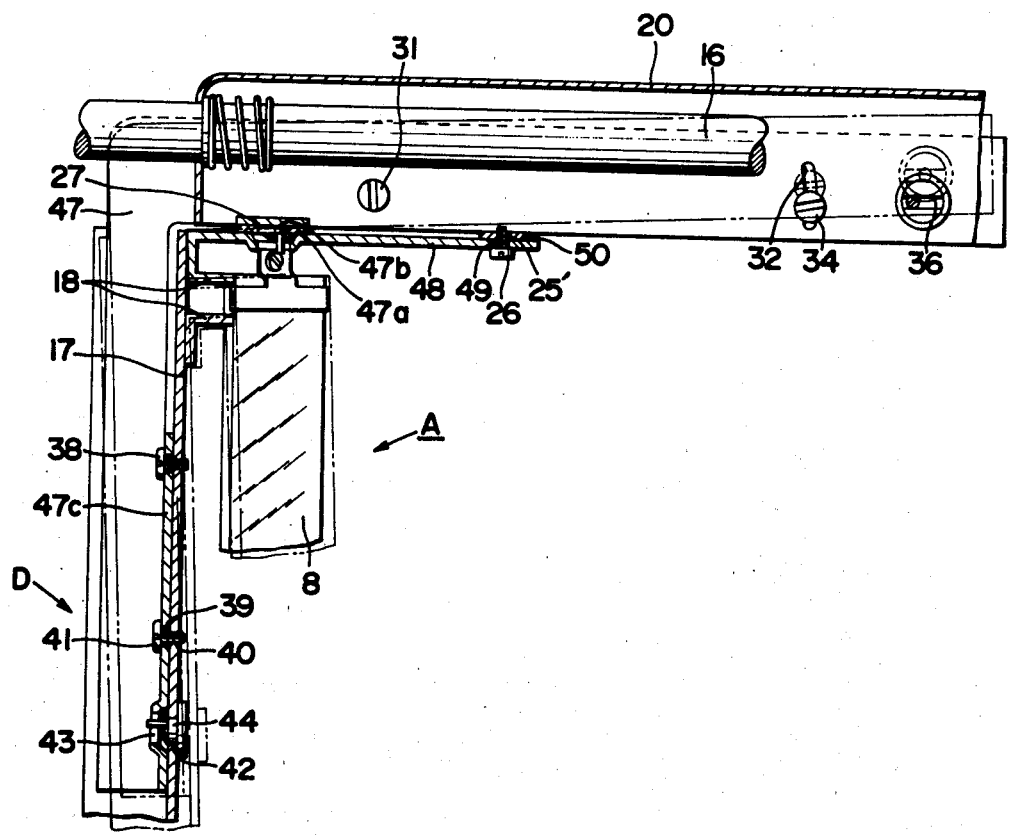
FIG. 7 is a horizontal sectional view of the abovementioned portions.
Figure 8:
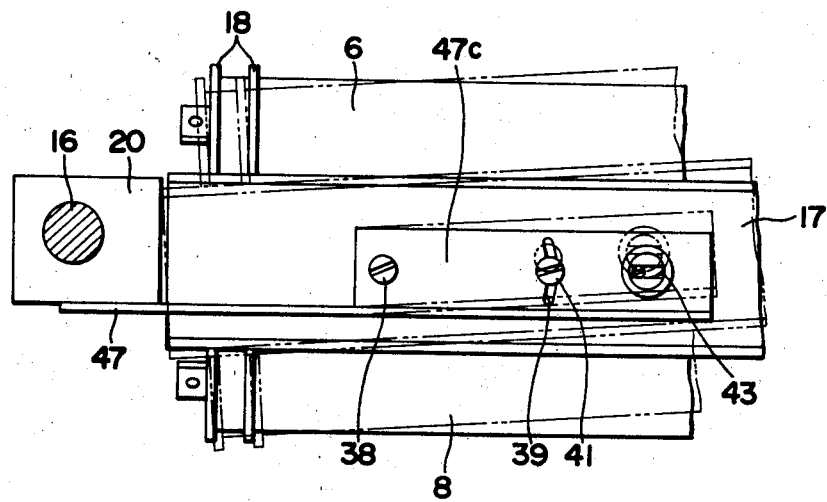
FIG. 8 is a side view of the 90°-mirror support.

The first adjusting means B, which is best shown in FIG. 6, are equipped with a support point screw 26 which is screwed to a screw hole 25' of a bent lug 50 of the sliding member 20 through an elongated hole 49 of a side wall 48 of the 90°-mirror support assembly A. This support point screw 26 is oriented in the horizontal direction which is perpendicular to the abovementioned guide rod 16. The first adjusting means B is also equipped with an eccentric pin 27 which is seated on an annular hole 47b of a fitting lug 47a of the auxiliary plate 47, and the head of this eccentric pin 27 is exposed outside the elongated hole 28 of the side wall 48. Accordingly, when the support point screw 26 is loosened and the eccentric pin 27 is rotated and adjusted, it becomes possible to adjust the positions of both mirrors in a plane including both optical axes c, d shown in FIG. 6 and inclination of the mirrors 6, 8 with respect to both optical axes c and d.

The second adjusting means C pertains to the adjustment of angle between the sliding member 20 and the auxiliary plate 47 with the support point screw 31 being the center, which support point screw 31 is screwed to a screw hole 30 of the auxiliary plate 47 through a small hole 29 of the sliding member 20. Namely, the second adjusting means C includes a fixing screw 34 that is screwed to a screw hole 33 of the auxiliary plate 47 through an arc-shaped elongated hole 32 formed on the sliding member 20, and an eccentric pin 37 which is seated on an annular hole 35 of the auxiliary plate 47 and has its head exposed outside from an elongated hole 36 of the sliding member 20. Hence, the fitting angle of the 90°-mirror support assembly with respect to the sliding member 20, or deviation of the mirror support assembly A within the horizontal plane of FIG. 7, can be adjusted by loosening the fixing screw 34 and adjusting the eccentric pin 37.

The third adjustment relates to adjustment of the auxiliary plate 47 relative to the 90°-mirror support assembly A with the support point screw 38 as the center, which support point screw 38 interconnects the 90°-mirror support assembly A to the auxiliary plate 47. In other words, the third adjusting means D is equipped with a fixing screw 41 that is screwed into a screw hole 40 of the 90°-mirror support assembly A through an arc-shaped elongated hole 39 formed on a vertical wall 47c of the auxiliary plate 47, and with an eccentric pin 44 that is seated on an annular hole 42 of the 90°-mirror support assembly A and has its head exposed outside from an elongated hole 43 of the vertical wall 47c. Accordingly, when the fixing screw 41 is loosened and the eccentric pin 44 is adjusted, the fitting angle of the 90°-mirror support assembly A to the sliding member 20 within the vertical plane, that is to say, deviation of the 90°-mirror support assembly in the vertical plane of FIG. 8, can be adjusted.

Incidentally, an adjusting screw 45 of FIG. 5 is provided in order to adjust a roller 46 to a height obtained by the abovementioned adjusting means. Though the foregoing embodiment deals with the case in which the device of the present invention is shown adapted to the right angle mirrors used for the optical system of the copying machine or the like, the device of the invention can of course be applied to a single mirror or a reflection mirror having a different angle, by way of example.

As can be clearly understood from the foregoing explanation, in accordance with the embodiment of the present invention, all the necessary adjustments can be carried out after the 90°-mirror assembly A is assembled to the machine frame. In other words, in assembling the 90°-mirror support assembly A, only the associated angle between the second and third mirrors 6 and 8 need be secured. Accordingly, it becomes possible to simplify the construction of the 90°-mirror support assembly A, and to reduce its weight, cost of production and its size. Since the adjusting mechanism of the device of the present invention has a wide range for allowance, strict requirements for the assembling accuracy for the 90°-mirror assembly itself as well as its associated members can be mitigated.

What is claimed is:

1. A mirror support assembly comprising:
   an elongated member; and
   a pair of support members rigidly secured to said elongated member in spaced apart relationship relative to each other;
   said pair of support members together comprising three protuberences which lie in and define one mirror locating plane;
   said pair of support members together further comprising three other protuberences which lie in and define another mirror locating plane which intersects said one mirror locating plane at a predetermined angle.

2. A mirror support assembly according to claim 1 wherein one protuberence from each group of three protuberences is located on one of said support members and wherein a pair of protuberences from each group of three protuberences is located on the other of said support members.

3. A mirror support assembly according to claim 2 wherein each of said support members comprises two diverging portions from which its respective protuberences project.

4. A mirror support assembly according to claim 1 comprising means connected to said elongated member for securing a mirror against each set of support members.

5. A mirror support assembly according to claim 3, wherein said predetermined angle is 90 degrees.

6. A mirror support assembly comprising:
   an elongated member;
   a pair of spaced apart support plates rigidly secured to said elongated member, each support plate comprising a pair of spaced-apart first and second diverging portions;
   one of said support plates having a single mirror supporting protuberence projecting from each of its pair of first and second diverging portions;
   and the other of said support plates having a pair of mirror supporting protuberences projecting from each of its pair of first and second diverging portions, respectively;
   the single protuberence from the first diverging portion of said one support plate and the pair of protuberences from the first diverging portion of said other support plate lying in and defining a first locating plane;
   the single protuberence from the second diverging portion of said one support plate and the pair of protuberences from the second diverging portion of said other support plate lying in and defining a second locating plane which intersects said first locating plane.

7. A mirror support assembly according to claim 6 comprising means connected to said elongated member for securing a mirror against each set of support members.

8. A mirror support assembly comprising:
   an elongated metal member having a channel-shaped cross-section;
   a pair of spaced support members welded to said elongated member;
   each of said support members being fabricated of sheet metal and comprising a base portion and a pair of integrally formed divergent arms extending at an angle from said base portion, each arm having an edge and at least one integrally formed mirror-engaging protuberence extending from said edge;
   and means connected to said elongated member for rigidly securing a mirror against said protuberence.

9. A mirror supporting assembly according to claim 8 wherein said means comprises:
   a pair of spaced apart holding members welded to said elongated member, each holding member being located near a support member and comprising a base portion, a pair of integrally formed divergent lug arms extending at an angle from said base portion, and each lug arm having an integrally formed lug extending therefrom;
   a support spring for each holding member and engageable with a mirror;
   and means for releasably connecting said support spring to a lug on an associated holding member.

10. In an electrophotographic copying machine or the like employing at least one mirror in its optical system, in combination:
    guide means;
    a sliding member mounted on and slidably movable along said guide means;
    a mirror support assembly for said mirror and connected to said sliding member and movable along a path in a plane;
    an auxiliary member connected between said mirror support assembly and said sliding member;
    first adjusting means connected between said sliding member and said mirror support assembly and between said auxiliary member and said mirror support assembly for adjustably rotating said mirror support assembly about a first axis parallel to said plane and transverse to said path;
    second adjusting means connected between said auxiliary member and said sliding member for adjustably rotating said mirror support assembly about a second axis transverse to said plane and transverse to said path; and
    third adjusting means connected between said auxiliary member and said mirror support assembly for adjustably rotating said mirror support assembly about a third axis parallel to said plane and parallel to said path.

11. A combination according to claim 10 wherein each of said adjusting means includes a support point member located on its respective axis, an eccentric means adjustable to effect axial rotation, and means to prevent unintentional axial rotation.

12. A combination according to claim 11 wherein said guide means comprises a pair of spaced apart parallel guide members;
    wherein said sliding member is slidably mounted on one of said guide members;

wherein said mirror support assembly has one end connected to said sliding member and has its other end mounted for movement on the other of said guide members;

and wherein said auxiliary member is connected nearer to said one end of said mirror support assembly than to said other end.

13. In an electrophotographic copying machine or the like, in combination;
guide means comprising a pair of spaced apart parallel guide members;
a sliding member mounted on and slidably movable along one of said guide members;
a mirror support assembly having one end connected to said sliding member and having its other end mounted for movement on the other of said guide members and movable along a path in a plane;
an auxiliary member connecting one end of said mirror support assembly to said sliding member;
first adjusting means connected between said sliding member and said mirror support assembly and between said auxiliary member and said mirror support assembly for adjustably rotating said mirror support assembly about a first axis parallel to said plane and transverse to said path, said first axis being defined by a support point member connected between said sliding member and said mirror support assembly;
second adjusting means connected between said auxiliary member and said sliding member for adjustably rotating said mirror support assembly about a second axis transverse to said plane and transverse to said path, said second axis being defined by a support point member connected between said sliding member and said auxiliary member;
third adjusting means connected between said auxiliary member and said mirror support assembly for adjustably rotating said mirror support assembly about a third axis parallel to said plane and parallel to said path, said third axis being defined by a support point member connected between said auxiliary member and said mirror support assembly.

14. A combination according to claim 13 wherein each adjusting means comprises an eccentric means adjustable to effect axial rotation and means to prevent unintentional axial rotation.

15. A combination according to claim 14 wherein said eccentric means of said first adjusting means is connected between said auxiliary member and said mirror support assembly.

* * * * *